June 29, 1971              T. A. DEAR              3,589,883
METHOD AND APPARATUS FOR THERMALLY FRACTURING A
RIBBON OF GLASS
Filed May 28, 1968
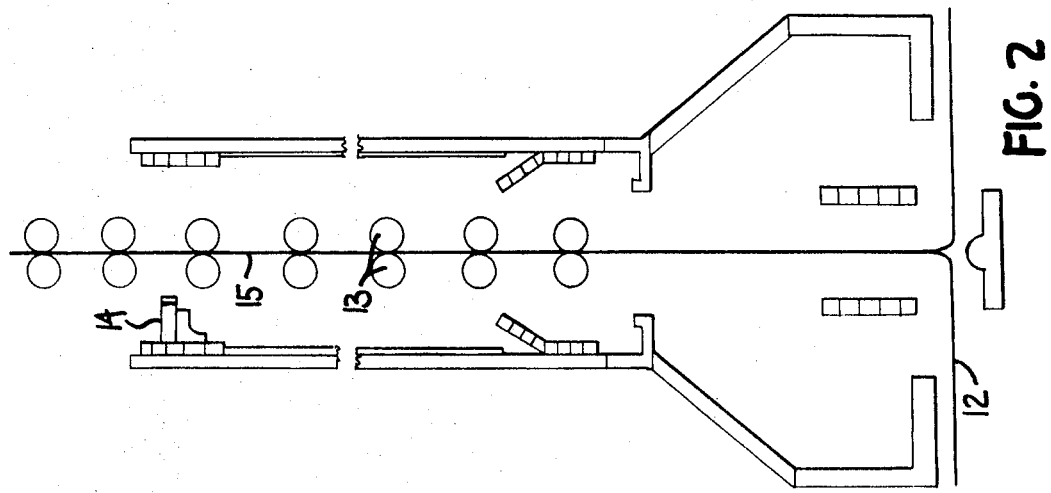
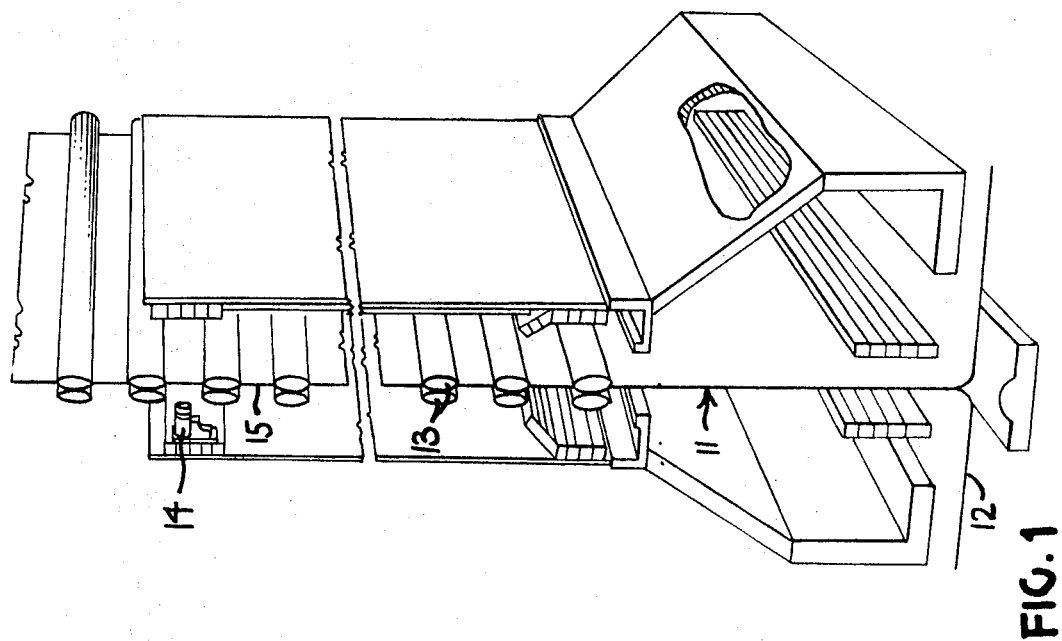
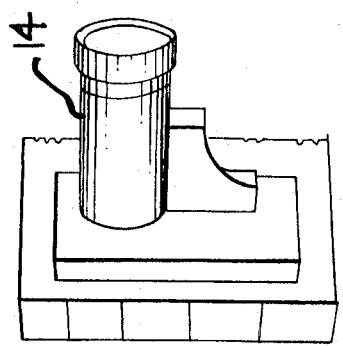
INVENTOR
TERRENCE A. DEAR
BY
ATTORNEYS United States Patent Office 3,589,883
Patented June 29, 1971

3,589,883
METHOD AND APPARATUS FOR THERMALLY FRACTURING A RIBBON OF GLASS
Terrence A. Dear, Allison Park, Pa., assignor to
PPG Industries, Inc., Pittsburgh, Pa.
Filed May 28, 1968, Ser. No. 732,686
Int. Cl. C03b 33/00, 33/10
U.S. Cl. 65—97                          5 Claims

ABSTRACT OF THE DISCLOSURE

A method of stripping the bulb edge from a sheet of window glass in a drawing machine by thermally inducing stresses in the glass and causing the glass to separate along the line of stress induction. The apparatus is a thermal source having a means for focusing and controlling the thermal output to the glass ribbon. The thermal energy is focused to a point on the surface of the glass, the energy being in an amount sufficient to upset the existing balance of tension and compression through the thickness of the glass and to induce a fracture in the glass.

---

This invention relates to methods and apparatus for severing an edge from a sheet of window glass being formed in a drawing machine. In the production of window glass a ribbon of molten glass is withdrawn from a pool and is drawn upwardly by rolls. The ribbon cools and hardens and is severed or capped. The ribbon of glass forms a thickness at the edges due to the more rapid cooling of the glass and the action of internal stresses forming a bulb edge.

Recent advances in the art of annealing, such as those disclosed in U.S. Pat. 3,251,671 to Robert Gardon and U.S. Pat. 3,301,650 to C. R. Ward, have made possible the annealing of glass in the drawing process. In the production of a continuous glass sheet or ribbon, proper annealing is necessary to produce glass which has a substantially uniform over-all residual stress pattern and, hence, acceptable cutting characteristics. There is an optimum range of residual stress in sheet glass which renders the glass most suitable for cutting. High stress values tend to increase cutting difficulties by increasing the tendency of the fracture to depart from a score line made by a cutting tool. The formation of this bulb edge results in non-uniform stress patterns which will seriously interfere with the cutoff or severing of the glass in the upper reaches of the drawing machine.

Applicant's invention provides a method and apparatus for severing the bulb edges from the ribbon while in the drawing machine, and the elimination of the bulb prior to cutting results in a sheet of glass having a uniform residual. This uniformity of tension results in several advantages which are important in the window glass drawing process. Among these advantages is that the capping or severing mechanism can be built and adjusted for handling a ribbon of glass which is substantially uniform in thickness, because the usual allowances for the bulb edge are not necessary. Treatment subsequent to the in-machine annealing of glass, wherein temporary stresses are controlled to reduce bending and warping, is benefited because the glass has a uniform tension across the sheet.

A full and complete understanding of this invention may be had by referring to the accompanying drawing wherein:

FIG. 1 shows a drawing machine;
FIG. 2 is a side view of the machine of FIG. 1;
FIG. 3 is a view of the drawing machine and thermal severing apparatus.

A ribbon of glass 11 is withdrawn from a pool of molten glass 12. The ribbon is drawn upwardly between rolls 13. The ribbon is slowly cooled and hardens so that in the upward reaches of the drawing machine the ribbon is relatively cooled and solidified. A radiant spot source 14 is positioned in the drawing machine and focused on the glass sheet in the area where the glass reaches the cutup floor in the drawing process, as described herein. The radiant source is focused at a point that describes a line of fracture as the sheet moves past the point source. The edges of high stress indicated by 15 can be removed while the sheet is moving at typical drawing machine speeds. A typical operation will produce a fracture using the point or spot source in $7/32$ inch thick sheet glass when the glass is being drawn at a speed of 30 inches per minute. The use of this radiant non-contact process is optimum with respect to any other mode of heat transfer. The fracture runs along the line of application of the heat source because of thermal stresses. It thus becomes necessary to be exact about the induction of stress distribution by the source to be employed.

In a typical example a test setup comprising a frame having drawing means, a spot source, and a series of representative sheets of glass were used. The sheet is drawn upwardly by vertical means in the support frame. A sample, $23\frac{7}{8}$ inches wide by 32 inches high and $7/32$ inch thick was used. A $\frac{1}{4}$ inch score was made on the top end of the sheet and on the face next to the spot source. An edge strip $7\frac{1}{4}$ inches wide was desired. Hence, the surface edge or score was made at a point $7\frac{1}{4}$ inches from the edge. The spot's heater or source was coupled to an energy device which was operated at 130 percent of input voltage or about 160 volts. The spot source was focused at 0.200 inch from the glass surface. The scored surface of the glass was then moved vertically up and past the heat source at a speed and distance as stated above. The fracture started at the score and ran for, i.e. lagged, approximately $\frac{1}{2}$ to 2 inches behind the heat source and maintained approximately this distance throughout the test. The vertical score ran straight and was stopped after opening the score for more than 20 inches.

This example is typical of the results obtained by applicant's method of thermally inducing a stress in a glass sheet. The strip edge or bulb edge is grasped by suitable rolls and moved gradually from relationship with the main ribbon and is disposed of with other glass waste. A preferred heat source was an infrared spot heater which produced a fracture running approximately 1 to 2 inches behind the focus point of the source. This method of removing the bulb edge in the drawing process eliminates all of the disadvantage of having to score and sever a ribbon having the non-uniform tension caused by the bulb edges. The ability of the heat source to induce a fracture without contacting the surface of the glass is a distinct advantage in eliminating the glass surface marring and other problems, both physical and mechanical, caused by attempting to score and fracture a vertical moving ribbon of glass.

It has been discovered that a piece of glass can be severed by applying a thermal source to induce a temporary thermal stress concentration along a selected line of fracture. The temporary thermal stress concentration is induced by the application of a thermal source placed at a distance from the glass. The stress can be concentrated around a selected stress point, that is, a defect in the glass such as a nick or scratch. The mechanism for the severing of glass is believed to be the buildup of a transient thermal gradient through the thickness of the glass, which upsets the existing balance between tension and compression, and the resulting imbalanced forces produce the fracture. Thermal sources intended to be employed include lasers, masers, lamps, flames, gas jets, and reflected extraneous energy and/or combinations of these sources. The energy source is concentrated along the desired path of fracture for a period of time depending upon the thickness and composition of the glass. The glass can be severed initially with a lower energy requirement if, prior to exposure, a nick or scratch is placed in the leading edge of the ribbon at the desired point of fracture to provide a focus of stress concentration. The application of the thermal source to the surface having the defect or nick provides a most efficient method of initiating the severing of the glass. In some applications a bending moment about a line passing through the edge nick produced the quickest severing of any of the methods.

In another embodiment, the energy source is positioned on both sides of the continuously moving sheet to be severed or stripped, especially in thicker glasses. This method reduces the total time required to induce thermal stress concentrations at a level which will fracture the glass.

In another embodiment hereof, a single source of energy 50 inches long can be utilized to sever the ribbon. The method and apparatus provide an economical and feasible way for the continuous or intermittent removal of edges or strips from a moving ribbon of glass in a sheet glass machine.

What is claimed is:

1. A method of severing a ribbon of glass in a window glass drawing machine wherein the ribbon is drawn upwardly along a path of travel from a molten pool of glass consisting essentially of:
   (a) providing a source of radiant energy at a distance from the glass;
   (b) focusing said energy to a point on the surface of said ribbon, said energy focused on the surface of said ribbon being in an amount sufficient to upset the existing balance of tension and compression through the thickness of said glass and to induce a fracture in the glass, and
   (c) moving said glass along said path of travel while exposed to said radiant energy to run the fracture down the ribbon so as to sever the ribbon.

2. Apparatus for severing a ribbon of glass in a window glass drawing machine consisting essentially of:
   (a) a source of radiant energy, said source being positioned relatively close to but spaced from said glass ribbon;
   (b) means for focusing the radiant energy from said source to a point on the surface of said ribbon in an amount sufficient to upset the balance of tension and compression through the thickness of said glass and to induce a fracture in the glass, and
   (c) means for moving said ribbon so as to establish a line of exposure on the surface of said ribbon to said focused radiant energy to induce a fracture in the glass and separate said ribbon along said line.

3. A method of severing the bulb edge from a ribbon of glass in a window glass drawing machine consisting essentially of:
   (a) providing a source of radiant energy adjacent a surface of said ribbon,
   (b) focusing said energy to a point on the surface of said ribobn adjacent said bulb edge thereof, said energy focused on the surface of said ribbon being in an amount sufficient to upset the existing balance of tension and compression through the thickness of said glass and to induce a fracture in the glass, and
   (c) moving said ribbon past said source of radiant energy so as to propagate said fracture and sever said bulb edge from said ribbon.

4. Apparatus for severing a ribbon of glass in a window glass drawing machine consisting essentially of:
   (a) a radiant energy source,
   (b) means for focusing said radiant energy from said source to a point on the surface of said ribbon in an amount sufficient to establish an imbalance of tension and compression through the thickness of the glass and to induce a fracture in the glass, and
   (c) means for moving said ribbon along a preselected path of travel past said source of radiant energy so as to expose said ribbon along a line on the surface thereof extending through the focal point of said radiant energy and sever said ribbon along said line.

5. A process for severing a ribbon of glass in a window glass drawing machine consisting essentially of:
   (a) establishing a source of radiant energy closely adjacent a surface of said ribbon,
   (b) focusing said radiant energy to a focal point on the surface of said ribbon in an amount sufficient to imalance the stress through the thickness of said ribbon and to induce a fracture in the glass, and
   (c) moving said ribbon along a path of travel such that said surface of said ribbon passes through the focal point of said radiant energy to propagate said fracture in said glass.

References Cited
UNITED STATES PATENTS

| | | | |
|---|---|---|---|
| 1,973,546 | 9/1934 | Spinasse | 65—97 |
| 3,124,444 | 3/1964 | Ritter et al. | 65—97X |
| 3,453,097 | 7/1969 | Häfner | 65—174X |

S. LEON BASHORE, Primary Examiner

S. R. FRIEDMAN, Assistant Examiner

U.S. Cl. X.R.

65—112, 174; 83—7; 225—93.5